METHOD FOR THE READING-IN AND THE READING-OUT
OF INFORMATIONS CONTAINED IN A FERRITE-CORE
STORAGE MATRIX

Filed March 18, 1958 4 Sheets-Sheet 1

INVENTORS
G. Merz - S. Ulmer
BY Robert Harding Jr.
ATTORNEY

METHOD FOR THE READING-IN AND THE READING-OUT OF INFORMATIONS CONTAINED IN A FERRITE-CORE STORAGE MATRIX

Filed March 18, 1958 4 Sheets-Sheet 2

INVENTORS
G. Merz - S. Ulmer

INVENTORS
G.Merz - S.Ulmer
BY Robert Harding Jr
ATTORNEY

Nov. 27, 1962 G. MERZ ETAL 3,066,281

METHOD FOR THE READING-IN AND THE READING-OUT OF INFORMATIONS CONTAINED IN A FERRITE-CORE STORAGE MATRIX

Filed March 18, 1958 4 Sheets-Sheet 4

INVENTORS

G. Merz - S. Ulmer

BY Robert Harding Jr

ATTORNEY

United States Patent Office 3,066,281

Patented Nov. 27, 1962

3,066,281

METHOD FOR THE READING-IN AND THE READING-OUT OF INFORMATIONS CONTAINED IN A FERRITE-CORE STORAGE MATRIX

Gerhard Merz, Rommelshausen, and Sieghard Ulmer, Stuttgart-Zuffenhausen, Germany, assignors to International Standard Electric Corporation, New York, N.Y., a corporation of Delaware Filed Mar. 18, 1958, Ser. No. 722,328
Claims priority, application Germany Mar. 21, 1957
6 Claims. (Cl. 340—174)

Figure 1:
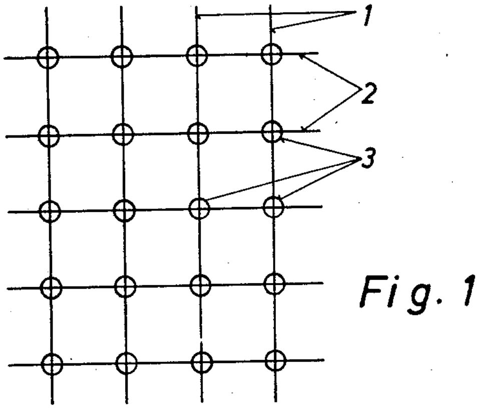

This invention relates to a method of reading-in and reading-out informations contained in a ferrite-core storage matrix, in particular in a matrix operating in a parallel arrangement.

Ferrite-core storage matrices, as well as arrangements for the reading-in or reading-out of informations, have been known for some time. They are used, for instance, in computing systems for the storing of informations in connection with the computing operation. A further possibility of practical application exists in electronic switching systems for the linewise storage of the informations as read out or obtained in a time-division multiplex method. Since it is necessary in this method that all informations contained in the matrix are read out in a linewise fashion, are corrected if necessary in a corresponding arrangement, and are then read in again, it is required that immediately after the reading-in of the corrected informations into the respective line, the next successive line will have to be read out for processing the informations thereof correspondingly.

To this end various methods and arrangements have already been proposed, all of which, however, have deficiencies. Thus, for instance, one conventional arrangement employ a central pulse generator connecting the individual lines by means of current gates to the reading-out or reading-in device. Disregarding the fact that this arrangement is of a disadvantage, due to the double embodiment of the coincidence arrangement, symmetrical connecting-through elements are used in this case which, however, call for very high control outputs, because normally the pulses have to be switched with an opposite polarity and a different amplitude.

On the other hand so-called transformer matrices for the linewise connection have been proposed, bearing the disadvantage, however, that the current flowing through the cores during the conversion of the information has to be maintained. Apart therefrom, and due to the low-operating voltage of transistors, this arrangement is not deemed suitable for the employment with transistors.

Besides the individual disadvantages, all of the conventional methods and arrangements have in common the disadvantage that time delays during the transmission from one line to the next one are unavoidable.

The invention is now based on the problem of avoiding the aforementioned disadvantages. An object of the invention is to provide an arrangement for the reading-in and reading-out of informations of a ferrite-core storage matrix, especially operating in a parallel arrangement. According to the invention the printing pulse is produced by a separately controlled monostable pulse generator, preferably a blocking oscillator, provided in common for all lines, or individually for each line, and is fed to the respective line, and the reading pulse generator of the monostable type, which is assigned in common to all lines, or individually to each line, and serving the generation of the reading pulse of the $(n+1)$th line is excited by the trailing edge of the writing (printing) pulse of the $n$th line.

In cases where one writing and one reading pulse generator are provided for each line, it is appropriate to excite the pulse generators for the writing pulses in a timely order of succession via a counting and coincidence arrangement, while the reading pulse generators are connected in such a way with the writing pulse generators that they are excited by the trailing edge of the writing pulse associated with the previous line. In this way a second coincidence arrangement will be saved, which, compared with the first one, would have to be somewhat displaced with respect to time. Apart therefrom the requirements with respect to the time accuracy of the coincidence matrix may be somewhat smaller.

It is also possible to employ the invention in cases where a reading and writing pulse generator is provided in common to all lines. In this particular case, connecting-through elements with respect to the individual lines will have to be used. If transistors are provided for this purpose, they would have to be modulated symmetrically in order to obtain a positive writing pulse and a negative reading pulse. This, however, requires a high-control output for the connecting-through elements and an unwanted additional supply of direct current. The direct current may still have an unwanted effect on account of the premagnetisation of possibly existing input and output transformers. Besides, also in the case of high-scanning frequencies, the timely correct switching-over of the connecting-through elements would be entailed by substantial difficulties.

According to a further embodiment of the invention these disadvantages are avoided and it is possible to feed the reading and writing pulse to the connecting-through elements with the same polarity, so that the transistor employed as connecting-through element may be operated asymmetrically.

In the further embodiment of the invention the writing and reading pulses are applied to parallel networks consisting of two current paths, namely, one path for feeding the writing pulse with the proper polarity to the $n$th line, and a second path for feeding the reading pulse with the proper polarity to the $(n+1)$th line. Accordingly, the networks are respectively connected together with the lines $n$ and $(n+1)$, $(n+1)$ and $(n+2)$ etc. The first current path comprises the writing pulse generator, a switch, a decoupling diode, as well as a first winding, whereas the second path contains the reading pulse generator, the same switch, a decoupling diode as well as a second winding, in which case the terminal of the switch facing the generator is applied to a fixed positive potential and the two current paths are connected together in such a way that in both windings a current with an inverted direction will flow when the output pulses of both generators will pass through the switch in the same sense. $W_{n1}$ constitutes the first part of the primary winding of the output transformer for the line $n$, and $W_{n2}$ the second part of the primary winding of the output transformer for the line $(n+1)$.

This connecting-through network is not limited to the particular circuit disclosed but may be advantageously employed in all cases where a central writing pulse and reading pulse generator is supposed to be connected to a storage matrix.

Figure 2:
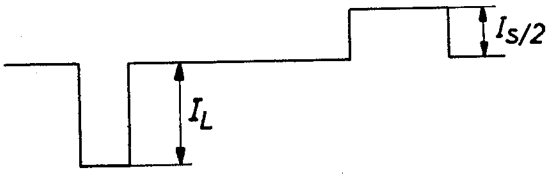
Figure 3:
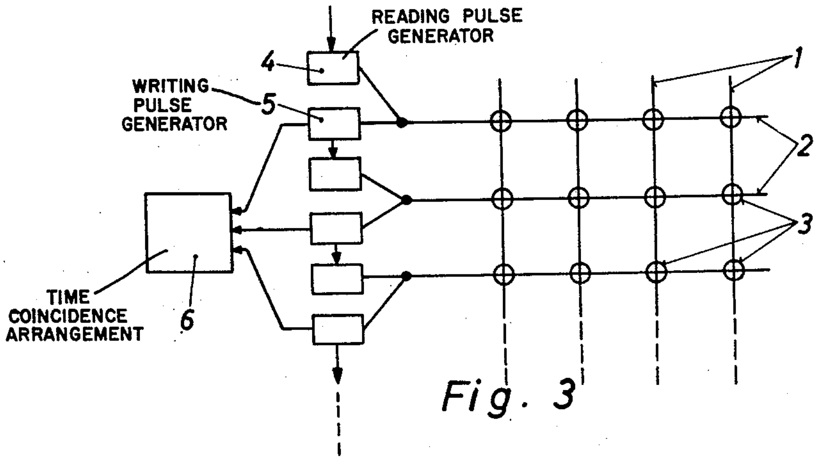
Figure 4:
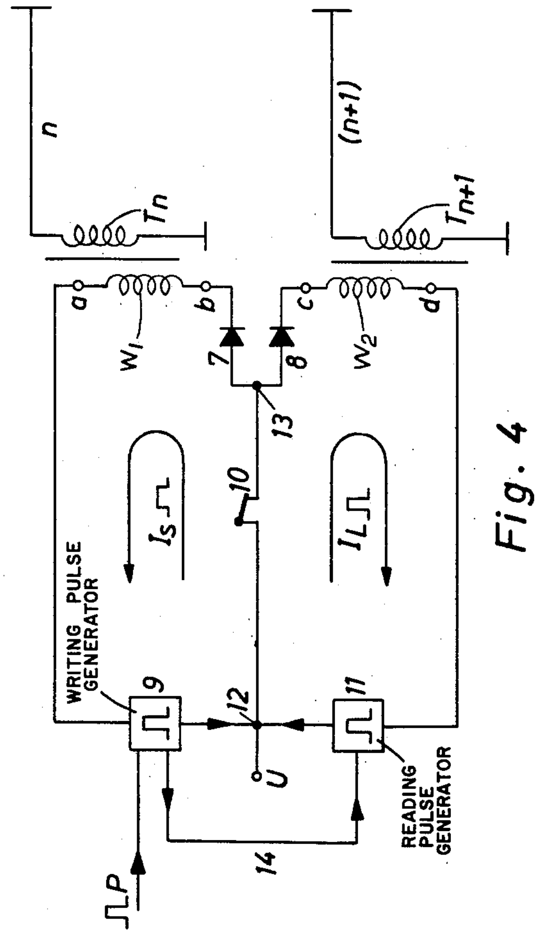
Figure 5:
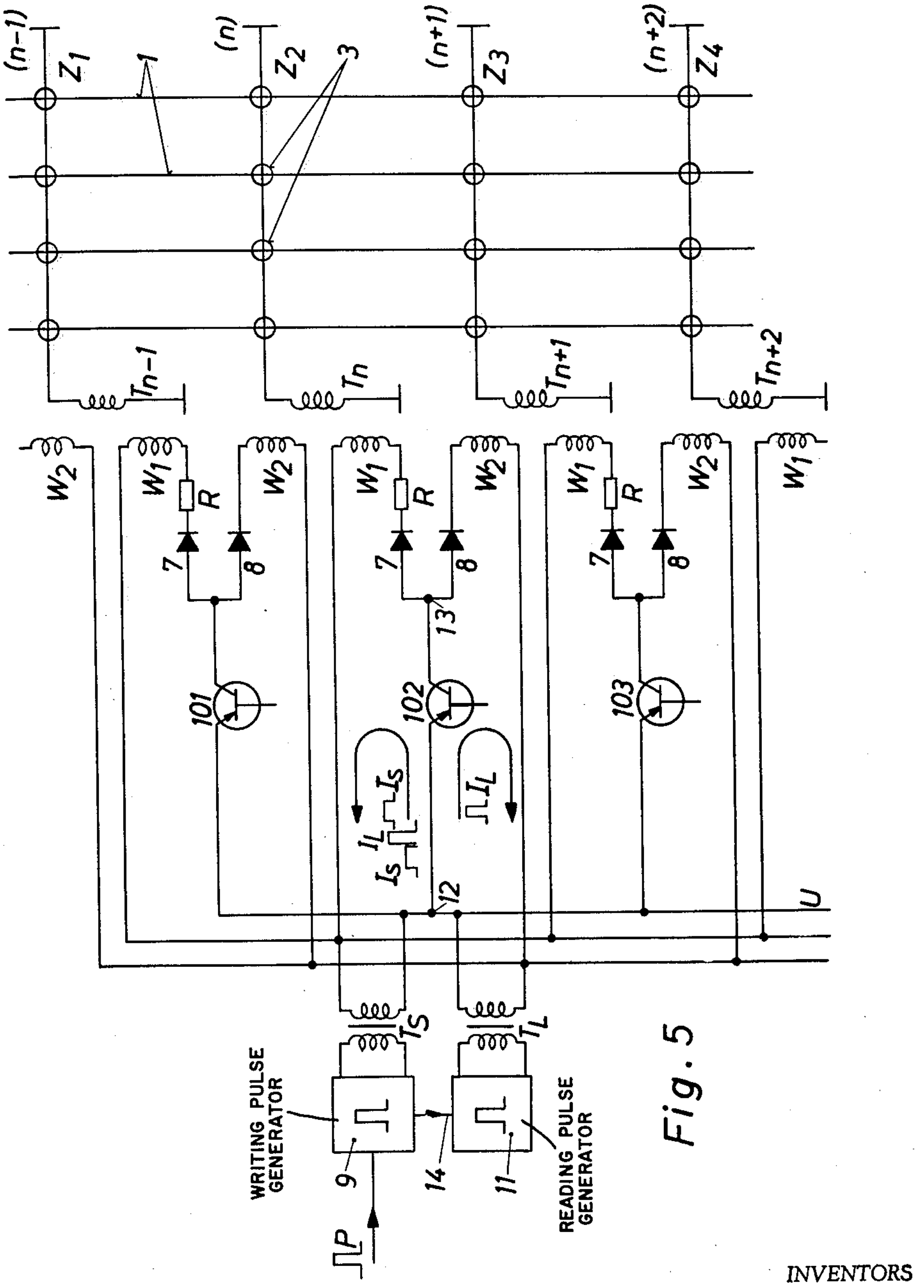
Figure 6:
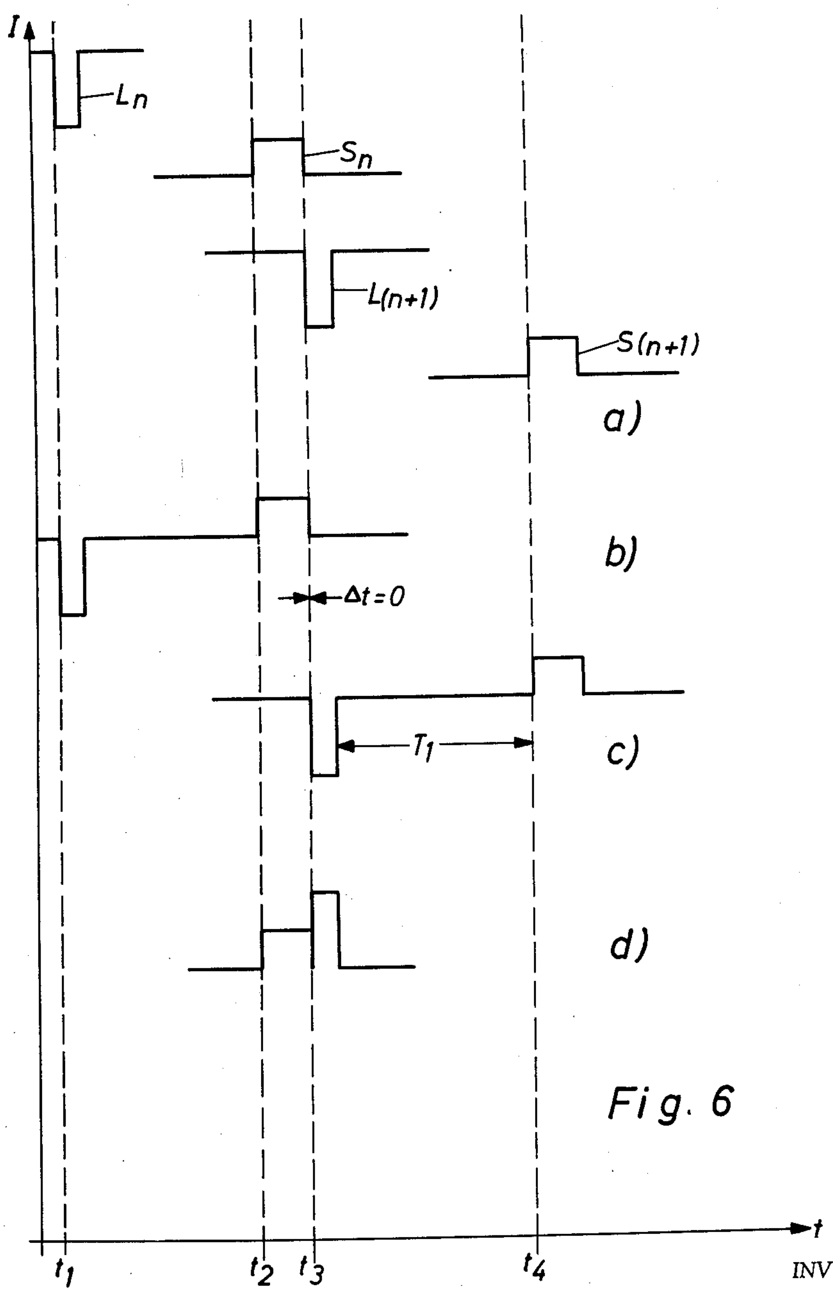

In the following, the invention will now be described in particular with reference to FIGS. 1–6 of the accompanying drawings, in which FIG. 1 shows an annular-core storage matrix of the conventional type; FIG. 2 shows the path of current of the controlled pulses used for the scanning of one line; FIG. 3 shows an arrangement for carrying out the invention by means of separate reading and writing pulse generators provided per line; FIG. 4 shows an arrangement for carrying out the invention when employing reading and writing pulse generators provided in common to all lines, i.e., by using one connecting-through network only; FIG. 5 shows an arrangement comprising several parallel-arranged connecting-through networks for several lines; and FIG. 6 shows the path of current relating to one of these networks.

The annular-core storage matrix, as shown in FIG. 1, comprises *m* columns 1 and *n* lines 2. The ferrite-cores 3 are wound in the conventional manner. The lines are now supposed to deliver or receive the wanted informations simultaneously. In accordance with this requirement, the informations per line have to be read in or read out simultaneously, i.e., in parallel with respect to one another. The reading-in of the information for each core is effected in the conventional manner by a coincidence of the half-writing currents in both the column and the line. The parallel reading of the lines is accomplished by the application to the respective lines by a current pulse having the necessary polarity and above all an amplitude sufficient for effecting the magnetic shifting of the cores.

In the example to be described hereinafter, the storage matrix is supposed to be read in accordance with the time-division multiplex method, in which at first the information of one line is always read, the resulting information, if necessary, being converted and the new information being read in again. The pulses are then applied to the lines via a corresponding logical arrangement of pulse generators.

The current-time diagram relating to the treatment of the informations resulting from one line is shown in FIG. 2 of the drawings.

As will be seen, the informations of one line are always processed before proceeding to the next line. In this case it is necessary that the reading pulse $I_L$ is applied with a double amplitude and a reversed polarity compared with the writing pulse $I_S$. Subsequently to the processing of one line, the next line will be interrogated. It is desirable, however, that between the termination of the reading-in into the *n*th line and the beginning of the reading-out of the $(n+1)$th line, as little time as possible is lost because, especially in the time-division multiplex method, only a very limited time is available for the interrogation of the entire matrix.

In FIG. 3 an arrangement of the invention is shown in which the requirements, as mentioned hereinbefore, are met. A reading pulse generator 4 and a writing pulse generator 5 are associated with each line. The writing pulse generators are connected with a time-coincidence arrangement 6, which is only shown schematically, because conventional means may be used for this purpose, and are excited by the arrangement 6 in the corresponding order of succession. The reading and writing pulse generators are connected together in such a manner that the trailing edge of the writing pulse will excite the reading pulse generator associated with the next line, as is indicated by the arrow lines extending between the reading and writing pulse generators. By means of this interconnection of the reading and writing pulse generators, no time will be lost between the reading-in of the one line and the reading-out of the next line.

FIG. 4 shows a modified arrangement of the invention. One common writing pulse generator provided for all lines and one common reading pulse generator, so that connecting-through networks are accordingly required. Each connecting-through network, according to a further embodiment of the invention, consists of two circuits which are decoupled with respect to each other by the action of the two diodes 7 and 8. The network, as shown, is assigned to the lines *n* and $n+1$. The first circuit comprises the writing pulse generator 9, the switch 10, the diode 7, as well as the winding $W_1$ of the transformer $Tn$, while the second circuit contains the reading pulse generator 11, the switch 10, the diode 8, and the winding $W_2$ of the transformer $T_{n+1}$. The terminal of the switch 10, facing the generators is applied to a fixed potential U. As switch 10, a transistor may be used the emitter electrode of which is connected with the point 12 and the collector electrode of which is connected with the point 13. The writing pulse generator is excited by a positive selecting pulse P, so that this generator will deliver one pulse to the first circuit. Since the potential is retained at the point U, the point *a* of the winding $W_1$ will become negative with respect to the point *b*, so that in the first circuit a pulse will travel from the point 12 via the switch 10 and the point 13, via the diode 7 and the winding $W_1$ back to the writing pulse generator 9. Since $W_1$ forms part of the primary winding of the line transformer $Tn$, a positive writing pulse will be flowing over the line *n*. The trailing edge of the writing pulse generated by the writing pulse generator will excite the reading pulse generator via the line 14, which, thereupon, will likewise deliver one pulse. This pulse will then flow in the second circuit, i.e., from the point 12 via the switch 10, the point 13, the diode 8, and the winding $W_2$, back to the generator. The reading pulse will now be transmitted with the aid of the transformer $T_{n+1}$ to the line $n+1$, that is, with negative polarity due to the inverted current flux in the winding $W_2$, i.e. inverted with respect to the winding $W_1$.

Accordingly, this network permits both pulses, namely, that of the writing pulse generator and that of the reading pulse generator to pass through the switch 10 with the same polarity, so that the switch does not need to be balanced by means of additional direct currents. Despite this, the line pulses are applied with the proper polarity due to the corresponding arrangement of the two windings $W_1$ and $W_2$.

In FIG. 5 an arrangement is shown in which several of the networks, as described in FIG. 4 above, are connected in parallel with the common writing and reading pulse generators. From this drawing the assignment of the individual networks to the respective lines will be easily seen. Transistors are used again for the switches 10. For the purpose of transmitting the pulses from the two generators to the parallel connected networks the two transformers $T_S$ and $T_L$ are provided.

In the following, the mode of operation of the arrangement according to FIG. 5 will be described in conjunction with the current-time diagram shown in FIG. 6.

At a predetermined time position $t_1$ the negative reading pulse $L_n$ will approach the line *n*, by which the information of this line is taken off and fed to the processing device. In the meantime the time-division multiplex arrangement effects a switching-over from the connecting-through network assigned to the lines $(n-1)$ and *n*, to the network of the lines *n* and $(n+1)$. That means the switch 101 is opened and the switch 102 closed. Accordingly, in the given example, the transistor 101 will be disabled and the transistor 102 will be marked. Thereupon, the time-division multiplex arrangement will deliver a new control pulse to the writing pulse generator, whereupon, at the time position $t2$, in the first circuit of the connecting-through network associated with the lines *n* and $n+1$, a positive writing pulse $S_n$ will be fed to the line *n*.

On account of the direct coupling between the writing and the reading pulse generator, the reading pulse generator, being excited by the trailing edge of the writing pulse, will deliver a negative reading pulse $L_{n+1}$ at the time position $t_3$ to the line $n+1$ via the second circuit of this network. Thereupon the switch 102 will be opened by the time-division multiplex arrangement, and the switch 103 will be closed, so that accordingly now the network assigned to the lines $(n+1)$ and $(n+2)$ is connected to the central generators. Upon arrival of a new control pulse Pat the time position $t_4$, the process as described in the foregoing will then be repeated with respect to the lines $n+1$ and $n+2$. These proceedings will be continued in the rhythm of the time-division multiplex generator frequency over the entire matrix. On account of this, a train of pulses will be transmitted over each line of the storage matrix, as is shown in FIG. 6(*b*) with respect to the line *n*, and in FIG. 6(*c*) with respect to the line $(n+1)$. This train of pulses corresponds to the program as required according to FIG. 2. From the showing of FIGS. 6(*b*) and 6(*c*) it will be clearly recognized that, at the time position $t_3$, i.e., at the transition from the writing of the *n*th line to the reading of the $(n+1)$th line, no loss of time will be suffered, and hence that $\Delta t=0$.

In FIG. 6(*d*) there is shown the train of pulses accruing in the switch 10. It will be seen that the direction of current flow remains unchanged, so that change-over operations will be superfluous.

In the arrangement, as described hereinbefore the stepping-on of the switches 10 is carried out in the pulse gap or interval between the reading and the writing pulse, so that the latter will be relatively greater and, consequently, also the time available for the logical operations will be extended. On the other hand, of course, it is possible that on account of the gain of time obtained by the circuit of the invention, the scanning frequency may be increased.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. An information reading-out and writing-in circuit arrangement for a ferrite-core storage matrix comprising a plurality of pairs of first and second networks, the networks of each pair having a common connection, a plurality of transformers each having two primary windings and a secondary winding, there being the same number of transformers as there are network pairs, means for producing a reading pulse and means for producing a writing pulse, means for coupling said writing-pulse-producing means to the first network of each pair in series with one of the primary windings of one of said transformers, means for coupling said reading-pulse-producing means to the second network of each pair in series with the corresponding other primary winding of the next adjacent transformer, switch means in said common connection of each network pair, said writing pulse coupling means and said reading pulse coupling means being so connected that current from both will flow in the same direction through said switch means, means for causing a writing pulse from said writing-pulse-producing means to initiate the operation of said reading-pulse-producing means, and means for coupling the secondary winding of each transformer to a coordinate wire of said matrix.

2. A circuit arrangement, as defined in claim 1, in which the switch means in each common connection comprises a transistor having a base, an emitter, and a collector electrode, with the emitter and collector electrodes connected in series in the common connection, whereby the base electrode may be used to control the current flowing in both networks of the pair.

3. A circuit arrangement, as defined in claim 1, in which the means for coupling the writing-pulse-producing means to the first network of each pair comprises a first transformer, the writing-pulse-producing means connected to the primary winding of said first transformer, and means for connecting the secondary winding of said first transformer in parallel with all the first networks of said pairs, and in which the means for coupling the reading-pulse-producing means to the second network of each pair comprises a second transformer, the reading-pulse-producing means connected to the primary winding of said second transformer, and means for connecting the secondary winding of said second transformer in parallel with all the second networks of said pairs.

4. An information reading-out and writing-in circuit arrangement for a ferrite-core storage matrix arranged in rows of cores, comprising a plurality of pairs of first and second networks, a switch common to the first and second network of each pair, a plurality of transformers each comprising a primary winding connected in one of said second networks a further primary winding connected in one of said first networks of another pair and a secondary winding connected to one of said rows, means for applying a writing pulse to each of said first networks, means responsive to the operation of said writing-pulse-applying means for applying a reading pulse to each of said second networks, said pulse applying means being adapted to cause uni-directional current through said switch.

5. An information reading-out and writing-in circuit arrangement, as claimed in claim 4, in which the reading-pulse-applying means includes means for applying a reading pulse to a second network instantaneously upon the completion of a writing pulse in the associated first network.

6. An information reading-out and writing-in circuit arrangement for a ferrite-core storage matrix arranged in *m* rows, comprising *m* pairs of first and second networks, the networks of each pair having a common connection, switch means connected in said common connection, *m* transformers each having two primary windings one of which is connected in series in the first network of the nth pair and the other of which is connected in series in the second network of the $(n-1)$th pair, said *m* transformers each further comprising a secondary winding connected to one of said rows of the storage matrix, means for selectively applying a writing pulse to each of said first networks and means for selectively applying a reading pulse to each of said second networks, whereby said pulses flow in the same direction through said switch means, and means for causing a writing pulse applied the nth first network to instantaneously to initiate the operation of said reading pulse applying means, so that a reading pulse is applied to the *n*th second network.

References Cited in the file of this patent

UNITED STATES PATENTS

| | | |
|---|---|---|
| 2,709,791 | Anderson | May 31, 1955 |
| 2,840,801 | Beter et al. | June 24, 1958 |